Nov. 8, 1932.                 E. MENEFEE                 1,887,275
                          CABLE FASTENING MEANS
                            Filed Nov. 5, 1930

INVENTOR
ELMER MENEFEE
BY
ATTORNEYS

Patented Nov. 8, 1932

1,887,275

UNITED STATES PATENT OFFICE

ELMER MENEFEE, OF ZANESVILLE, OHIO, ASSIGNOR TO JAMES R. KEARNEY CORPORATION, OF ST. LOUIS, MISSOURI, A CORPORATION OF MISSOURI

CABLE FASTENING MEANS

Application filed November 5, 1930. Serial No. 493,544.

This invention relates to cable fastening means and more particularly to an improved device for tying together a pair of cables for the purpose of maintaining them in parallel, adjacent relation.

Such a device, which may be designated as a cable or guy clip, is most frequently employed in connection with a cable clamp for securing the dead or looped end of the cable which is doubled back, beyond the clamp, to the main strand. When employed in this manner, the cable clip provides for a neat and slightly cable junction and prevents the projecting cable end from becoming a nuisance or menace to a lineman. A frequent practice in the past was to serve or mouse the end of the cable with a number of turns of fine wire, to prevent ravelling of the cable strands, and to continue these windings around the main portion of the cable, for securing the dead end thereto. The cable clip serves both purposes and its use results in a number of advantages over the older method, as will hereinafter appear.

An object of the present invention is to provide a device of the type mentioned, which may be easily and quickly applied, requiring no special tools or particular skill on the part of the workman.

Another object of the invention is to provide a cable clip which may be economically manufactured with little or no waste of material.

A further object of the invention lies in the provision of an improved cable clip having portions adapted to embrace the entire circumference of each cable. By reason of this construction, a portion of the clip is literally wrapped around the entire circumference of each cable, which precludes any tendency of the clip to slip off of the paired cables.

These and other objects and advantages will appear from the following detailed description and accompanying drawing, which illustrates a preferred embodiment of the invention.

Figure 1:
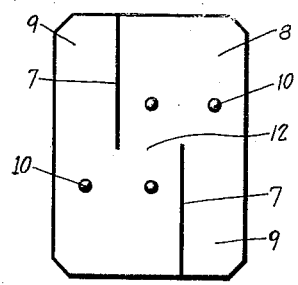
Figure 2:
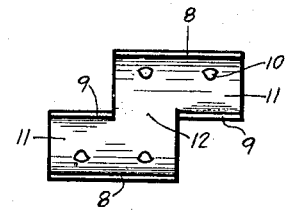
Figure 5:
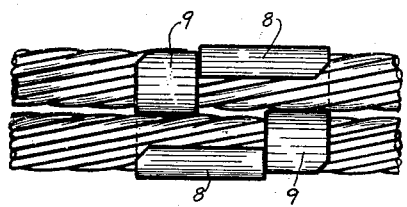
Figure 6:
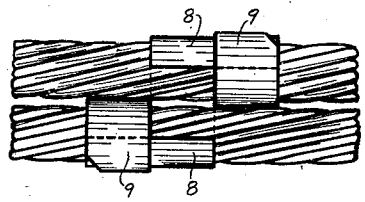
Figure 3:
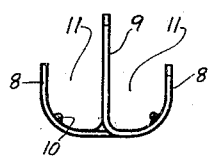
Figure 4:
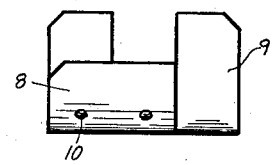

In the drawing, Fig. 1 is a plan view of a sheet metal stamping of preferred shape from which the cable clip, shown in plan in Fig. 2, is formed; Fig. 3 is an end view, and Fig. 4 a side view of the clip; and Figs. 5 and 6 illustrate different methods of applying the clip to a pair of cables.

My cable clip is formed from a substantially rectangular blank (shown in Fig. 1), stamped or otherwise suitably fashioned from sheet material of suitable thickness to insure rigidity to the finished article. While the dimensions of this blank will be determined by the cable size for which the clip is to be adapted, I prefer to form the blank with one longer dimension and one shorter dimension, as shown. Also, to reduce the hazard of personal injury, as by cutting, in handling the device, the blank is preferably stamped with blunt corner portions.

Referring now by reference numerals to the drawings, 7 indicates one of a pair or more of slits or incisions through the blank, and each of which extends inwardly from opposite side edges thereof, a distance substantially equal to half the width of the blank. The slits 7 are preferably mutually parallel and spaced laterally from each other, each slit dividing its respective side of the blank into portions of unequal width. Obviously, by reason of this design, the portions of greater width, designated at 8, are diagonally opposed, as are the smaller portions, designated at 9.

For a purpose which will hereinafter appear, I provide on the blank a number of small protuberances or bosses 10, disposed preferably on the portions 8 and projecting outwardly from the upper surfaces thereof as shown in Fig. 1. Like projections may be formed on the portion 9, if desired, and may extend from corresponding surfaces of these members or if the clip is to be applied in the manner shown in Fig. 5, the bosses to be effective must project from the opposite or under faces of these members.

In forming the blank into the cable clip of my invention, the portions 8 and 9 are bent to provide a pair of semi-tubular cable receiving seats 11, the upper faces of the members 8 forming the inner surfaces of the seats. As best appears in Fig. 3, the portions 9 make a substantially right angular bend along the longitudinal median of the clip, and the portion of the clip lying between these members, indicated at 12, serves to tie the cable seats together.

After thus forming the clip, the bosses 10 on the portions 8 project inwardly, where they are adapted to engage the helical grooves formed in the cables by the spirally wound strands. Thus the clip, when properly applied, is permanently positioned on the cables by means of the bosses, and endwise slippage of the clip along the cables is prevented.

The application and manner of the use of the described clip will be apparent to those familiar with the art from the drawing and foregoing description.

The clip may be applied so that each cable is embraced by adjacent wide and narrow portions 8 and 9 of the clip, as indicated in Fig. 5, or by opposite wide and narrow portions, as shown in Fig. 6.

In providing a sheet metal stamping having marginal incisions, a clip is formed in which each cable is embraced by a pair of arms, such as 8 and 9. It will at once appear obvious that any number of such cuts may be provided in the stamping, which may be of any desired initial dimensions, whereby to produce any number of paired cable embracing arms, each of any desired width.

While the above description, accompanied by the drawing, is directed to a preferred embodiment of my invention, I realize that certain changes may be made in the device shown without departing from the spirit and full intended scope of the invention.

I claim as my invention:

1. A cable clip comprising a pair of parallel cable receiving seats having adjacent lateral openings, and joined along a portion of their length, each of said seats having an extended wall between the seats, adapted to be bent into overlying relation with one cable.

2. A cable clip including a pair of semi-tubular cable receiving seats having adjacent lateral openings and connected together only along a fractional portion of the length of each seat, and cable-holding members extended between the seats and adapted to engage paired cables substantially over the remaining portion of the length of each seat.

3. A cable clip including a pair of laterally adjacent, semi-tubular cable receiving seat portions, a portion extending between and connecting said seat portions, and wall portions between said seats, each adapted to be bent into overlying, securing relation with a cable in either seat.

4. A cable clip including a pair of parallel longitudinally offset cable receiving portions each of partly tubular form, and each having one wall portion extended transversely of the cables and adapted to be bent into holding relation with a cable.

5. A cable clip including a pair of preformed parallel, semi-tubular cable receiving seats disposed in staggered relation endwise of the clip, and having cable receiving openings disposed in adjacence on the same side of the clip.

6. A cable clamping device having a pair of substantially parallel channeled portions, flexible arms extending from adjacent sides of said channeled portions, adapted to be bent over a pair of cables positioned in said channeled portion.

7. A cable clip having laterally adjacent channeled portions for receiving a pair of cables, spaced arms extending from adjacent sides of said channeled portions, and adapted to be bent in opposite directions, for securing cables in said channeled portions.

8. A cable clip formed of sheet material having substantially parallel channeled portions disposed in staggered relation, portions disposed at opposite ends of said clip, and adapted to be bent into clamping engagement with a pair of cables disposed in said channeled portions.

9. A clamping device for cables and the like, including a pair of parallel, longitudinally offset cable receiving seats, members carried by the device and adapted to extend between paired cables disposed in said seats, and coacting therewith to secure the device to a pair of cables.

10. A connector for cables and the like, including a pair of laterally adjacent semi-tubular members disposed in staggered relation and joined along a portion of their length, said members having projecting wall portions adapted to be bent about paired cables disposed on opposite sides of said portions.

11. A connector for cables and the like including cable seats, flexible cable securing portions extending between said seats and arranged to be bent about the cables for securement thereof to said seats, and projections on the connector adapted for preventing movement thereof along the cables.

12. The combination with a pair of cables, of a one-piece connector therefor including paired annular portions, one surrounding each of said cables, a member connecting, and serving to space said annular portions endwise of the cables and connector, and projections on the connector adapted for preventing movement thereof along the cables.

13. A cable-serving clip including a body of sheet metal formed to provide a pair of parallel cable-receiving seats and having a side opening to receive paired cables, the opposite margins of the body projecting beyond the opposite sides of the paired cables and adapted to be bent over the cables for securing the clip thereto, and a tongue portion projecting in a direction away from the cable receiving seats, and disposed to extend between the paired cables engaged thereby.

14. A clip for mousing paired guy cables and the like, including a body of flexible metal bent into substantially U-shaped transverse section, the body having a base of a width to receive a pair of parallel cables and providing adjacent seats therefor, the body being of a depth to project, marginally, beyond the cables engaged thereby, the opposite lateral margins adapted to be bent toward each other into overlying, holding relation with the paired cables, and a tongue or flange member formed by incision of the body, and located to project between paired cables engaged by the clip.

ELMER MENEFEE.